US006567527B1

United States Patent
Baker et al.

(10) Patent No.: US 6,567,527 B1
(45) Date of Patent: *May 20, 2003

(54) ELONGATED OVAL BATTERY ASSEMBLY FOR CANAL HEARING DEVICE

(75) Inventors: Ross Baker, Bellaire, TX (US); Loren L. Roy, San Jose, CA (US); James P. Buckley, San Jose, CA (US); Patrick V. Williams, San Jose, CA (US); Adnan Shennib, Fremont, CA (US); Richard C. Urso, Redwood City, CA (US)

(73) Assignee: Insound Medical, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/632,888

(22) Filed: Aug. 7, 2000

(51) Int. Cl.⁷ ................................................ H04R 25/00
(52) U.S. Cl. ...................... 381/323; 381/322; 381/324; 381/328
(58) Field of Search ................................ 381/312, 322, 381/323, 324, 328, 380; 181/130, 135; 600/25, 559; 607/55–57; 429/163, 164, 168

(56) References Cited

U.S. PATENT DOCUMENTS

| 5,701,348 | A | * | 12/1997 | Shennib et al. | 381/322 |
|---|---|---|---|---|---|
| 5,724,431 | A | * | 3/1998 | Reiter et al. | 381/323 |
| 5,825,896 | A | * | 10/1998 | Leedom | 381/322 |
| 6,058,198 | A | * | 5/2000 | Aceti et al. | 381/322 |
| 6,208,741 | B1 | * | 3/2001 | Shennib et al. | 381/322 |

* cited by examiner

Primary Examiner—Curtis Kuntz
Assistant Examiner—Suhan Ni

(57) ABSTRACT

A miniature battery assembly for canal hearing devices is constructed of a cylindrically elongated metal shell having oval cross section. The elongated oval design offers superior volumetric utilization and energy capacity in the ear canal when compared with conventional button cell designs. In a preferred embodiment, the battery assembly is comprised of an elongated anode can with an inward bottom ledge holding a cathode cup. The anode can is tapered on the top and oval in cross section for fitting optimally in the bony part of the ear canal. The hearing device incorporating the battery assembly is disposable to be discarded upon depletion of the electrical energy of the battery assembly.

54 Claims, 8 Drawing Sheets

ELONGATED OVAL BATTERY ASSEMBLY FOR CANAL HEARING DEVICE

CROSS-REFERENCE TO RELATED APPLICATIONS

This application is related to pending patent application Ser. No. 09/327,717, filed Jun. 8, 1999, titled "Extended Wear Canal Hearing Device," referred to herein as "the '717 application," assigned to the same assignee.

BACKGROUND OF THE INVENTION

1. Technical Field

The present invention relates generally to miniature hearing aid batteries which are volumetrically energy efficient and asymmetrically shaped for fitting deeply and comfortably in the ear canal.

2. Description of the Prior Art (1) Conventional Hearing Aid Batteries

Figure 1:
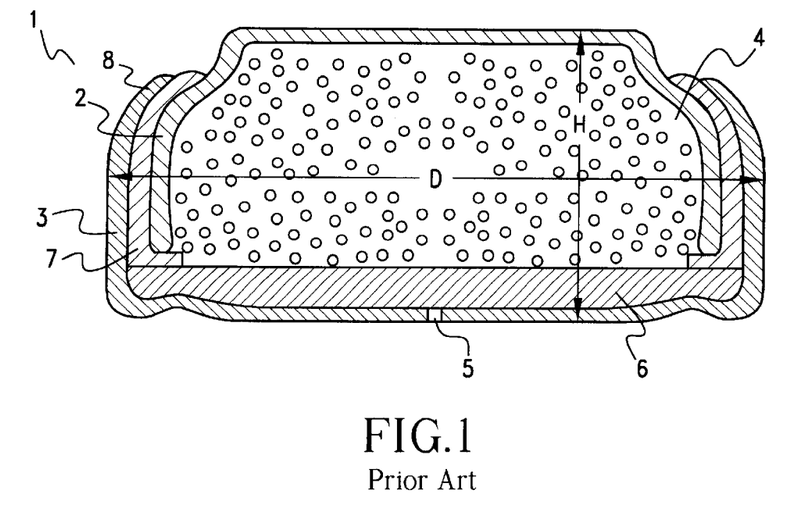
FIG. 1 is cross sectional view of a prior art button cell battery used in conventional hearing aids having circular cross section with diameter (D) and height (H). The height (H) being less than diameter (D), as discussed above.
Figure 2:
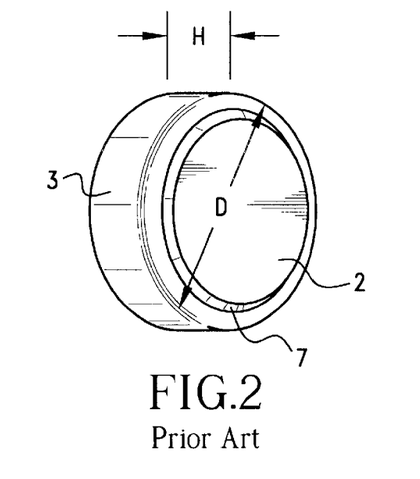
FIG. 2 is a perspective view of the prior art battery of FIG. 1 showing a circular cross section (round perimeter), discussed above.

Hearing aids primarily rely on button cells which are symmetrically round as shown in FIGS. 1 and 2. These cells are circular in cross section with diameter (D) and height (H). The cells are generally button-shaped with diameter (D) greater than height (H) thus referred to as "button cells." These prior art cells are constructed of a cathode (positive) can 3 crimped over an anode (negative) can 2 at crimp area 8 near the top. A sealing grommet 7 is present between the two cans. Zinc air cells, which rely on air (oxygen) in the environment as a source for their internal electrochemical reaction, are widely used in hearing aid applications due to their exceptional volumetric energy efficiency. Air hole 5 on the bottom of the cell allows oxygen from the environment to enter the cell into the cathode assembly 6 and subsequently into the anodic material 4 (zinc) inside the anode can.

(2) Brief Description of the Ear Canal and Canal Hearing Aids

Figure 3:
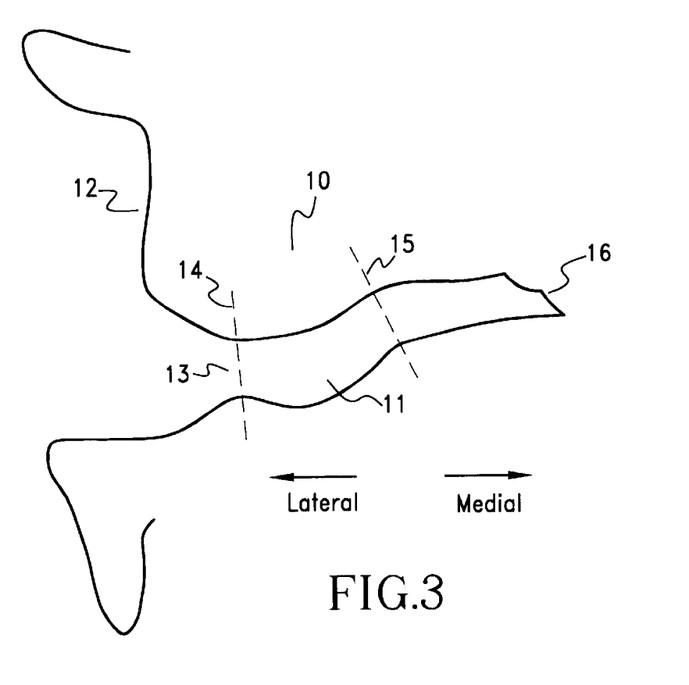
FIG. 3 is a coronal (top) view of the external ear illustrating the tortuously elongated ear canal, as described above.
Figure 4:
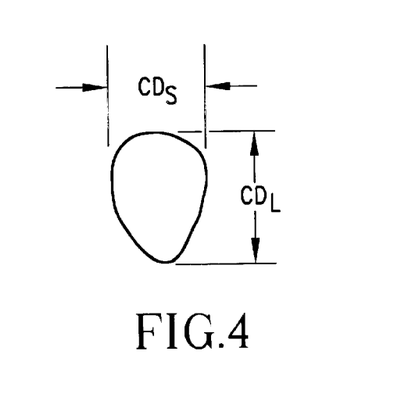
FIG. 4 is a cross sectional view of the ear canal in FIG. 3 showing its oval cross section.

The human external ear 10 is comprised of the pinna 12 and the ear canal 11, which is narrow and tortuously elongated as shown in FIG. 3. The ear canal 11 begins laterally with the canal aperture 13 and terminates medially with the eardrum 16. First and second bends, 14 and 15 respectively, are generally present and must be considered when designing a deeply inserted canal hearing device. The ear canal generally has an oval cross section (FIG. 4) with a long diameter ($CD_L$) and short diameter ($CD_S$).

Recent advances in miniaturization of electronics, transducers and batteries have led to the development of canal hearing aids which are partially or deeply inserted in the ear canal. Canal hearing devices are generally inconspicuous, thus very desirable for the hearing impaired who may be concerned with the social stigma and vanity associated with wearing a visible hearing aid. However, due to the complex shape of the ear canal, being elongated, contoured and oval at the cross section, the conventional cylindrical button cells used in standard canal hearing devices are inefficient in terms of volumetric utilization of the ear canal cavity. For this reason among others, canal hearing aids are notorious for requiring frequent battery replacement and being uncomfortable, particularly for small ear canals.

(3) Review of State-of-the-Art in Hearing Aid Related Battery Technology

Cretzmeyer, et al. (U.S. Pat. No. 4,189,526), Smilanich (U.S. Pat. No. 4,404,266) and Oltman et al. (U.S. Pat. No. 5,582,930) describe zinc-air button cell batteries with various improved features. These button cell batteries are made of a cathode can crimped over an anode can with a sealing element therebetween (i.e., 2 in FIG. 2 of the '930 patent). Although each metal can may be made relatively thin, in the range of 0.114 to 0.15 mm according to the '930 patent, the presence of two parallel walls on the circumference of the cell (2 and 3 in FIG. 1), in addition to a seal (7 in FIG. 1) therebetween, presents a triple-wall effect which adversely affects the volumetric efficiency (battery longevity/volume) for the battery assembly. This results in shorter battery life and frequent battery replacement. A battery compartment for the button cell with electrical contacts also consumes space further reducing the volumetric efficiency of the hearing device. Another source of volumetric inefficiency in conventional hearing aids is the acrylic outer shell (not shown) which represents a secondary enclosure with respect to the battery assembly within, thus consuming additional space and reducing the volumetric efficiency of the canal hearing device.

Aceti et al. in U.S. Pat. No. 6,058,198 describes a hearing aid assembly with a battery integral therewith. According to the '198 patent, the anodic material and air-cathode assembly are contained within a unitary plastic housing along with electronic circuit and transducers (speaker and microphone). This approach eliminates the concept of a battery subassembly, thus appearing more efficient in its volumetric energy efficiency. However, combining anodic elements along with hearing aid components is not practical due to the corrosive effects of battery chemicals on electrical circuits, wires and other components within the hearing aid. Furthermore, eliminating a battery subassembly complicates the manufacturing process since the battery function cannot be independently tested or verified prior to its incorporation into the hearing device.

Leedom in U.S. Pat. No. 5,825,896 describes a hearing aid having two hinged boot portions, one of which incorporates a battery and a speaker. The '896 patent describes the shape of the boot portion as having an elliptical cross-section which is advantageous for fitting deeply and more comfortably in the ear canal. However the '896 patent does not specifically teach an elliptical battery assembly but rather elliptical boot portions. Furthermore, the '896 patent does not describe the casing configuration of the battery assembly, nor does it describe the relationship between individual elements of the battery assembly, particularly pertaining to energy capacity.

In the aforementioned related '717 application, Shennib et al. describe a battery assembly having an oval cross section when combined with a section of a hearing aid connected thereto. The battery assembly in the '717 application is elongated and oval in cross section thus suited for fitting deeply and comfortably within the ear canal. Similarly, the '717 application does not describe the specific relationship of the elements within the battery assembly, particularly those pertaining to energy capacity improvements. Both '896 patent and '717 application fail to teach the specific features and manufacturing processes which lead to improved volumetric energy capacity.

A key goal of the present invention is to provide a battery assembly with improved energy capacity and fit in the human ear canal, particularly in the bony region thereof.

Another goal of the present invention is to provide a disposable hearing aid, incorporating the invented battery assembly, and specifically suited for extended wear applications in which a hearing aid is worn continuously in the ear canal for a relatively long period of time, preferably several months.

SUMMARY OF THE INVENTION

The invention provides a volumetrically energy efficient battery assembly for use with canal hearing devices that fit deeply in the ear canal. The invented battery comprises a cylindrically elongated metal shell, a metal cup covering an opening at the base of the elongated metal shell, and a sealing element positioned therebetween for sealing the contents of the battery assembly within. The battery assembly is medially tapered with length (L) across the longitudinal axis of the ear canal when placed therein. The cross section is oval with long and short diameters, ($D_L$) and ($D_S$), respectively. The short diameter $D_S$ is less than the length (L) thus the battery is configured elongated and narrow to fit optimally and deeply in ear canals, which are also narrow, tortuous and oval in cross section. In the preferred embodiments, the metal shell of the invented battery assembly is structurally self-supporting and is essentially in direct exposure to the environment of the ear canal, thus eliminating the need for a secondary plastic enclosure typically used in conventional hearing aids with button cells.

In the preferred embodiments of the invention, the battery assembly is bullet shaped with oval cross section for maximum volumetric energy efficiency and optimal comfort during wear and insertion thereof in the ear canal. A hearing device employing the invented battery assembly can be made smaller because it is volumetrically more energy efficient. It is particularly suitable for extended wear applications deep in the ear canal. In the preferred embodiments of the invention, the battery assembly is manufactured and tested as a subassembly, which is then integrated into a disposable hearing aid. The hearing aid is discarded when the electrical energy of the incorporated battery assembly is depleted.

BRIEF DESCRIPTION OF THE DRAWINGS

The above and still further goals, objectives, features, aspects and attendant advantages of the present invention will be better understood from the following detailed description of the best mode presently contemplated for practicing the invention, with reference to certain preferred embodiments and methods, taken in conjunction with the accompanying Figures of drawing, in which.

DETAILED DESCRIPTION OF THE PREFERRED EMBODIMENTS AND METHODS

The present invention, illustrated in FIGS. 5–14, provides a battery assembly having a metal shell elongated and oval cross section for fitting optimally in the oval human ear canal.

Figure 5:
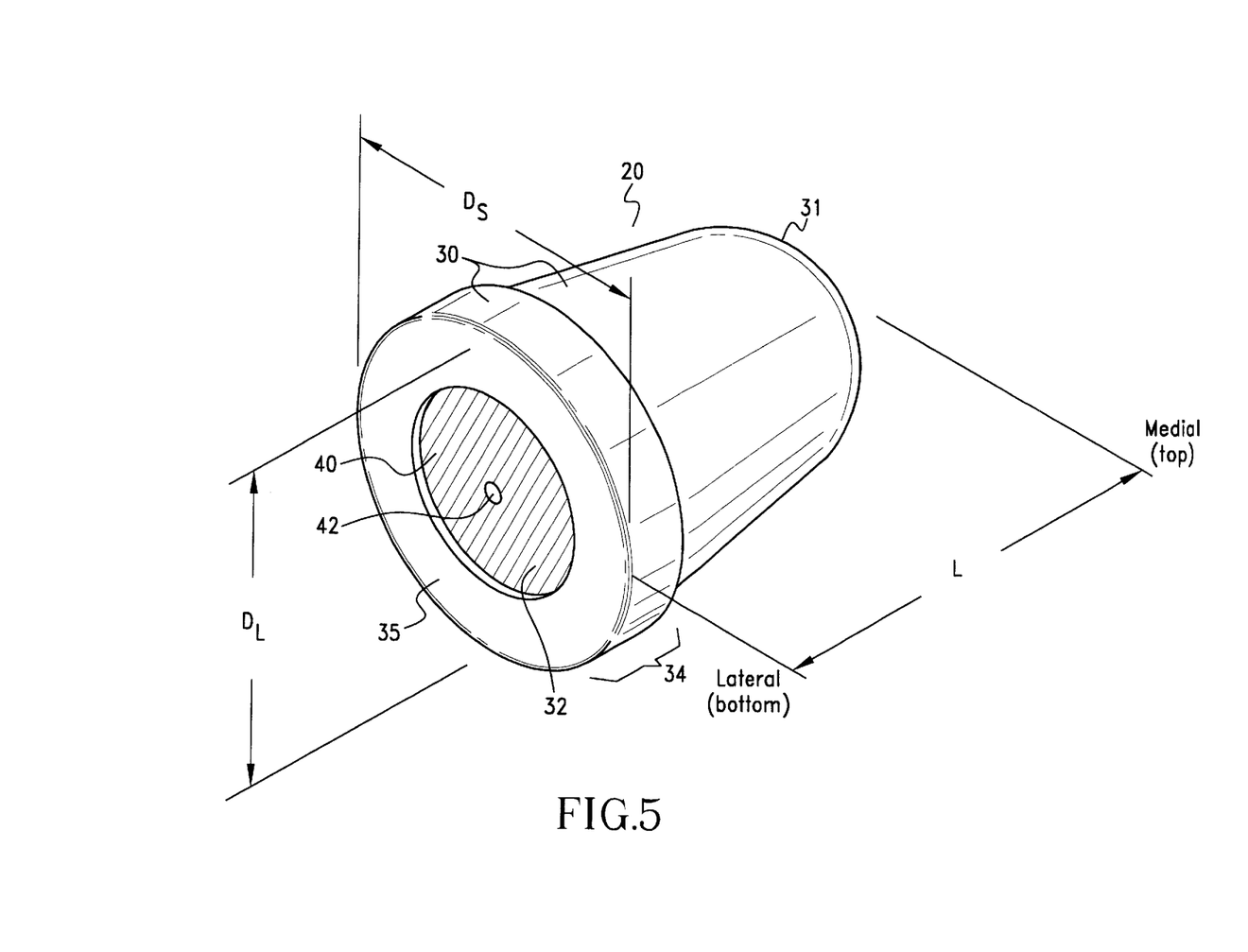
FIG. 5 is a perspective view of a preferred embodiment of the invented battery assembly showing its elongated structure (L) and elliptical cross section with long diameter ($D_L$) and short diameter ($D_S$)
Figure 6:
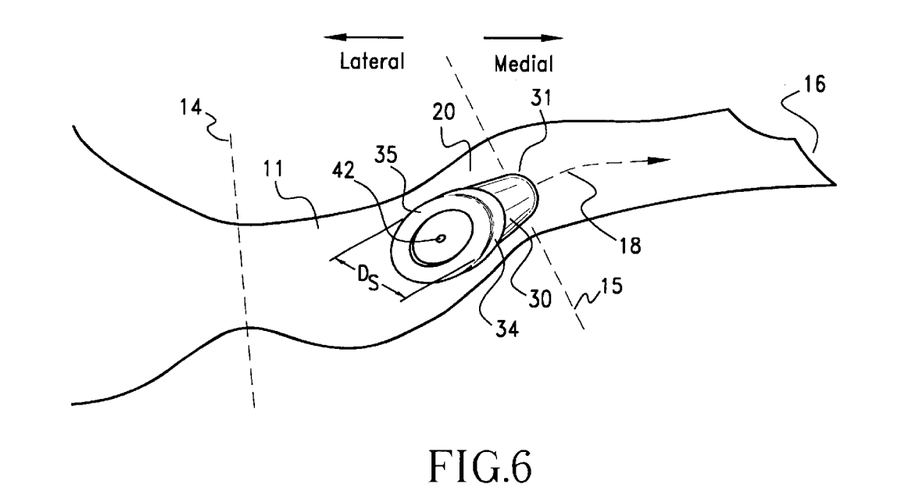
FIG. 6 is a perspective view of the invented battery assembly of FIG. 5, illustrating its insertion in the ear canal.

In a preferred embodiment shown in FIGS. 5–10, the battery assembly 20 comprises an elongated metal shell 30 having a shell opening 32 and a metal base cap 40 which covers the shell opening 32 from the bottom and seals the contents of the battery assembly therein. The shape of the battery, shown in FIG. 5, is elongated with length (L) and oval cross section (i.e., egg-shaped, elliptical, rectangular with rounded corners, etc.) with long diameter ($D_L$) and short diameter ($D_S$) as shown. Long diameter ($D_L$) is preferably about 1.5 times the length of the short diameter ($D_S$), and length (L) is greater than the short diameter ($D_S$). The elongated and medially tapered battery 31 is optimal for insertion and positioning in the ear canal 11 along its longitudinal axis, as shown in FIG. 6. Medial tapering 31 is particularly useful in negotiating the contours and bends of the ear canal 11 as the battery assembly, or a hearing device associated therewith, is being inserted as shown in FIG. 6 (arrow 18).

The unique shape and design of the battery assembly of the invention allows for improved volumetric energy efficiency by using a thin single-walled metal shell having elliptical cross section which resembles the oval cross section of the ear canal.

Figure 7:
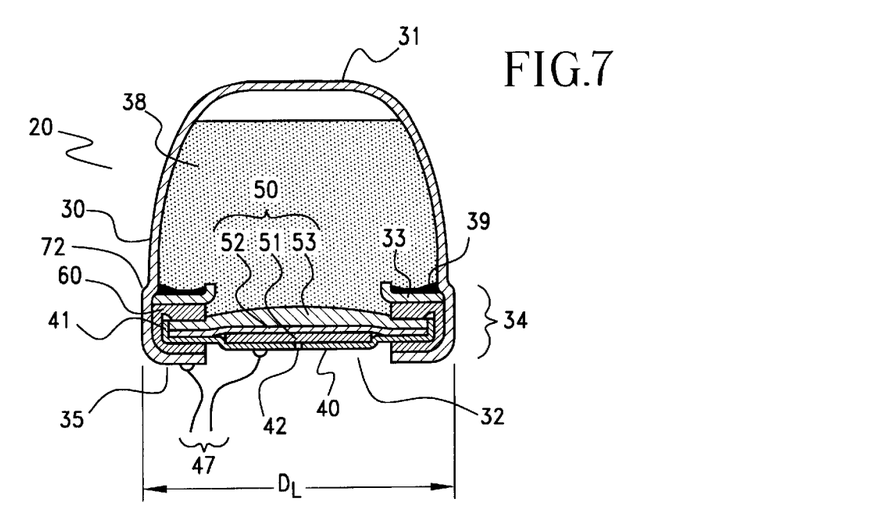
FIG. 7 is detailed cross-sectional view of the preferred embodiment of FIG. 5 along the plane of the long diameter ($D_L$), with the anode can shown crimped inwardly at the bottom over the cathode base cap (lateral with respect to the ear canal) end.
Figure 8:
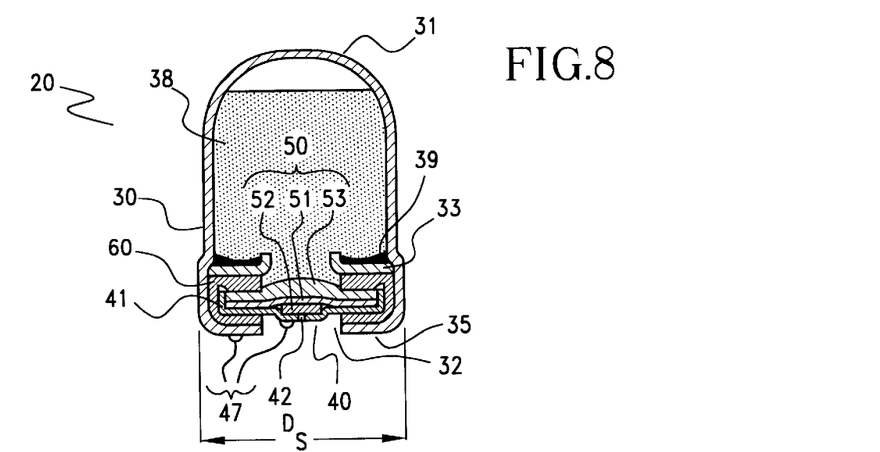
FIG. 8 is detailed cross-sectional view of the preferred embodiment of FIG. 5 along the plane of the short diameter ($D_S$)
Figure 9:
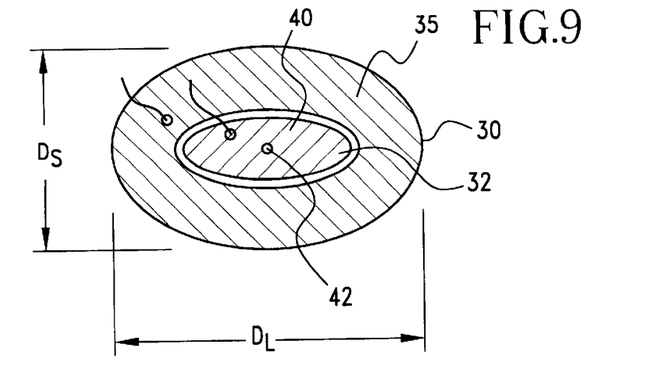
FIG. 9 is bottom view of the bottom (lateral) end of the preferred embodiment of FIG. 5 showing its oval cross section having long and short diameters, ($D_L$) and ($D_S$), respectively.

FIGS. 7–9 (assembled) and 10 (exploded unassembled view) are detailed views of the battery assembly in a preferred embodiment manufactured using zinc-air battery chemistry. The air cathode assembly 50 (shown in more details in FIG. 10) represents several layers of active and passive materials known in the art of battery design. Air (oxygen) reaches the cathode assembly from an air hole 42 within base cap 40. Subsequently, air is distributed underneath the cathode assembly via air distribution layer 51 made of a porous material (i.e. filter paper). Air flow is then reduced by a diffusion-limiting layer 52 (FIG. 10) which limits air diffusivity into the cathode assembly to the extent required by the current drain rate of the battery assembly. A hydrophobic membrane (not shown for clarity) is used to reduce moisture access into or out (i.e., reduce moisture penetration) of the battery assembly. Cathode catalyst 53 (sometimes referred to in the field as the cathode assembly) facilitates oxygen reduction in the presence of electrons provided by a metallic mesh with the production of hydroxyl ions which react with the zinc anode. Cathode catalyst 53 typically contains carbon material. Embedded in the cathode catalyst is a current collector (not shown for clarity) typically composed of a nickel mesh. The cathode current collector is electrically connected to the metal lip 41 of the metal base cap 40 as shown. A separator (barrier layer, also not shown for clarity) is typically present on the top of the cathode assembly to prevent zinc particles from reaching the catalyst 53 while allowing the passage of hydroxyl ions through it. Anodic material 38 (FIGS. 7 and 8) present within the shell 30 is typically made of amalgamated zinc powder with organic and inorganic compounds including binders and corrosion inhibitors. The anodic material 38 also includes the electrolyte, typically an aqueous solution of potassium hydroxide (KOH) or sodium hydroxide (NaOH).

Metal-air chemistry such as zinc-air is advantageous in achieving high-energy capacity as well known in the field of battery technology. However, other chemistries may be employed and in certain applications are desirable. For example, by employing lithium or other non-air based reactions, the air hole and moisture gain/loss concerns can be eliminated. Other materials and arrangements may be used in the construction of the elongated oval battery assembly as will become obvious to those skilled in the art of battery design.

Figure 10:
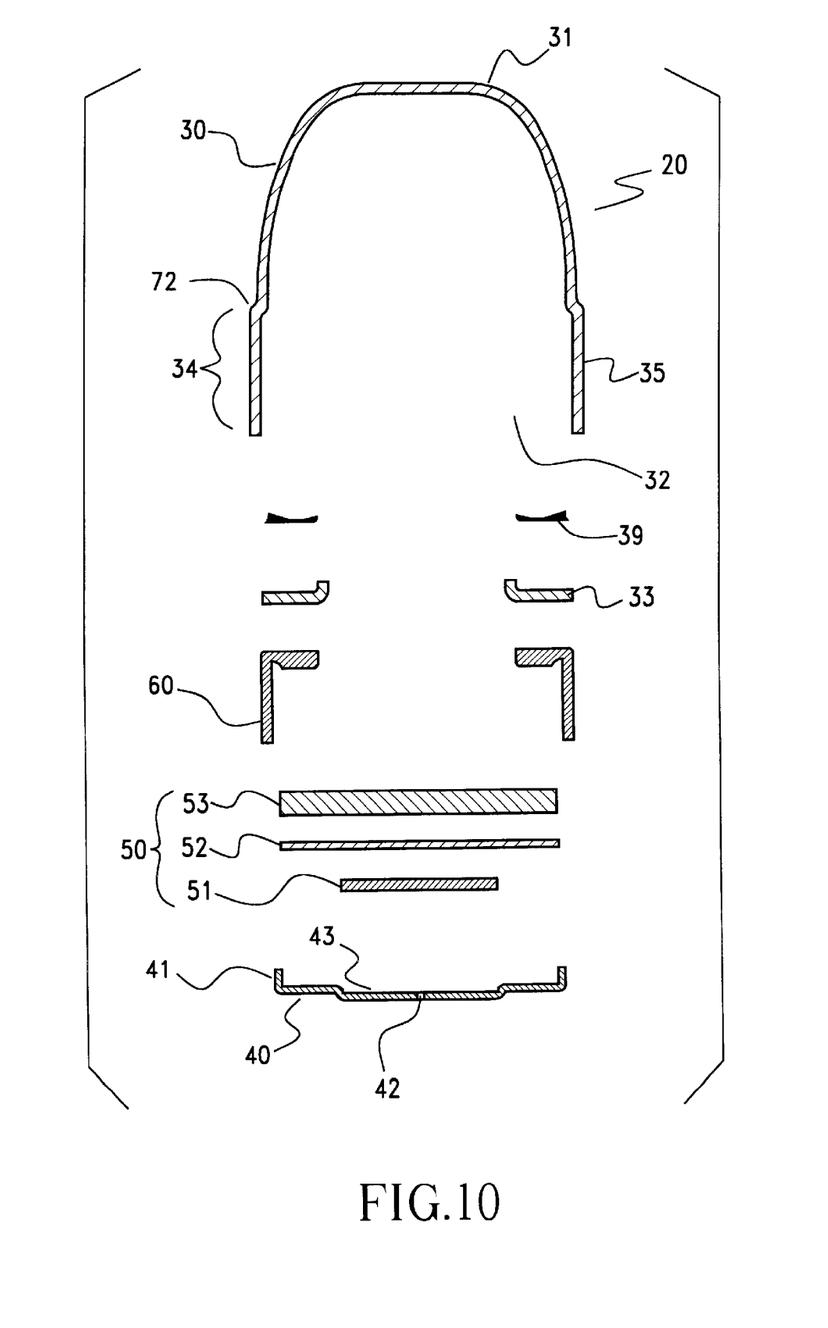
FIG. 10 is a detailed exploded (unassembled) cross-sectional view of the preferred embodiment of FIG. 5.

The cathode assembly 50 is placed over the base unit 40 with air distribution layer 51 placed within the recess 43 of base cap 40 as shown FIG. 10. The cathode assembly 50 is secured by the base cap 40 on the bottom and the retention ledge 33 on the top side. The bottom section 34 of the shell 30 comprises a bottom ledge 35 which is formed by crimping the bottom section 34 of the anode shell 30 inwardly over the base cap 40 during the manufacturing processes of the battery assembly 20 as shown in FIGS. 7 and 8.

FIGS. 7 and 8 show the cathode assembly 50 (51, 52, and 53 in FIG. 10) being in a state of compression at the circumferential edge due to axial and radial compression forces exerted by the crimped bottom ledge 35. Grommet 60 is wedged between the base cap 40 on the bottom, the sides of the base section 34, and the retention ledge 33 on the top as shown. Grommet 60 is preferably made of nylon or like material for providing electrical insulation between the metal anodic shell 30 and the metal cathodic base cap 40. Grommet 60 also provides sealing of the anodic material 38 within the anodic shell 30. The bottom ledge 35 and retention ledge 33 apply compressive axial forces on the grommet 60 and the cathode assembly 50.

In the preferred embodiments of the invention, the anode shell 30 is made of either a bi-clad or tri-clad material such as stainless-steel/copper or nickel/stainless-steel/copper. The stainless steel comprises most of the thickness of the shell and provides the structural support for the shell. The outermost layer is stainless-steel (bi-clad) or nickel (tri-clad), providing a high electrical conductivity surface. The inside of the shell is preferably made of oxygen free copper which forms a surface alloy inhibiting oxidation and reducing reactions with the zinc inside the shell. The anode shell has thickness of less than 0.2 mm and preferably in the range of 0.1 to 0.16 mm.

Figure 11:
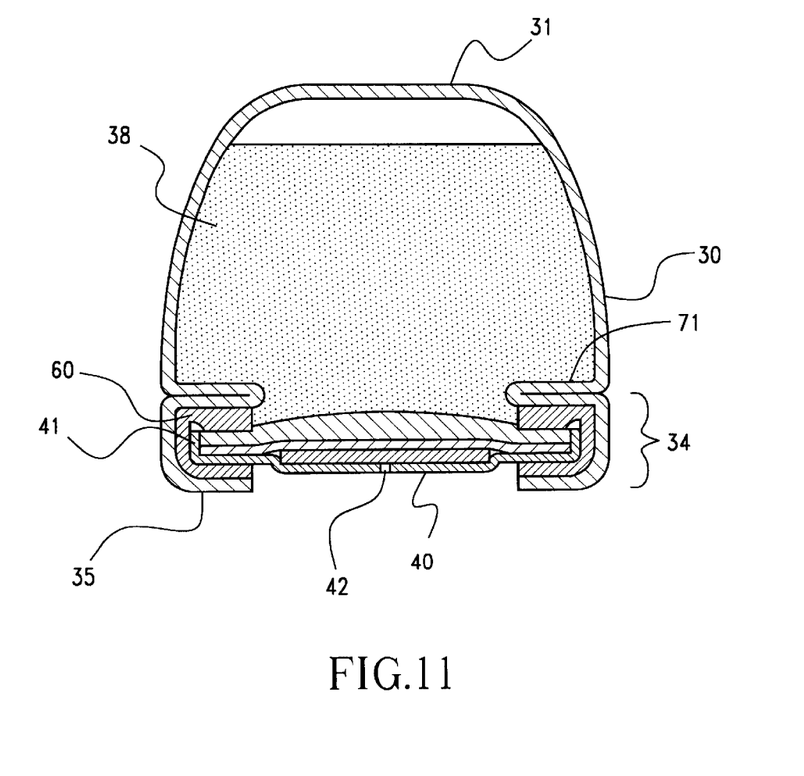
FIG. 11 is a cross-sectional view of an alternate embodiment of the retention ledge being collapsed bead along the circumference of the shell for securing the cathode assembly and the grommet.

The retention ledge 33 may be secured to the interior walls of the anode shell 30 by welding or brazing an oval ring as shown in FIGS. 7, 8 and 10. The ring is held in position partially by a retention step 72 along the surface of the shell 30. Bonding agent 39 (i.e., solder or braze) is preferably used to bond the retention ledge 33 to the anode shell 30. In the preferred embodiments, the retention ledge 33 is made of copper ring which is inserted into the anode shell and subsequently brazed in place to form a counter-compression lip for the nylon grommet 60. The material used for brazing must similarly not react negatively with the internal chemistry of the battery. The braze material 39 is a low-temperature alloy (<700° F.) capable of joining the copper ring to the copper clad on the inside of the anode shell 30 below the tempering point of the stainless steel and below the melting temperature of the copper. The brazing alloy is preferably amalgamable. Brazing alloys with Lead (Pb), Silver (Ag) and Indium (In) are amalgamable, and in the right concentrations allow for low melting points. For example a composition of Pb (97.5%)/Ag (2.5%/In (5%) produces an alloy melting at 590° F. A composition of In (97%)/Ag (3%) produces an alloy melting at 289° F. Other acceptable alloys may also include Au (Gold), Pd (Palladium), and/or Zn (Zinc). The retention ledge may also be formed by beading the shell 30 circumferentially at the top of the base end 34 forming a collapsed bead 71 as shown in FIG. 11.

The electrical contact to the invented battery assembly may be formed by an electrical wire 47 soldered or welded onto the outer conductive surface of the metal shell 30, or the base cap 40, as shown in FIGS. 7 and 8.

Figure 12:
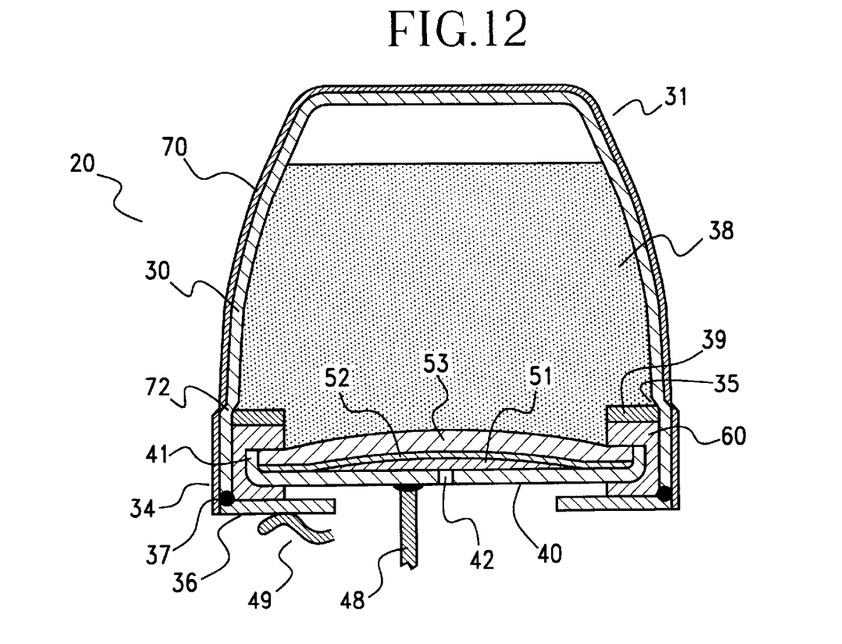
FIG. 12 is a cross sectional view of an alternate embodiment of the oval battery assembly with anode can comprising a metal ring welded at the bottom end thereof, and also showing a non-structural ultra-thin coating over the anode can and a pin terminal on the cathode cap.

FIG. 12 shows an alternate embodiment of the invented elongated oval battery assembly having a bottom ledge formed by a ring 36 welded onto the base section 34 of the shell 30 at welding area 37. FIG. 12 also shows an alternate embodiment of an electrical contact for the base cap being in the form of a terminal pin 48 which is insertable into an appropriate receptacle (not shown) within a hearing device. The metal anode shell 30 is electrically connected to a conductive contact pad 49 (spring contact) provided by the hearing device (not shown for clarity). The battery assembly of FIG. 12 also comprises an ultra thin non-structural protective coating 70. The coating 70 is preferably biocompatible.

Figure 13:
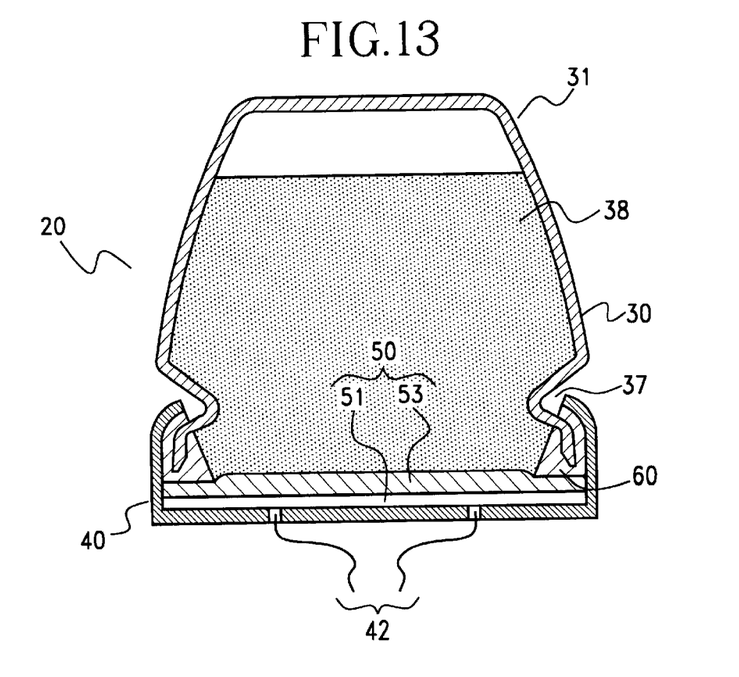
FIG. 13 is a cross sectional view of an alternate embodiment of the oval battery assembly with a cathode can crimped over a lateral groove along the circumference of the anode can.

FIG. 13 shows yet another embodiment of the elongated oval battery assembly having a base can 40 crimped over a groove 37 within shell 30. FIG. 13 also shows multiple air holes 42 for a more distributed air access into the enclosed cathode assembly 50.

Figure 14:
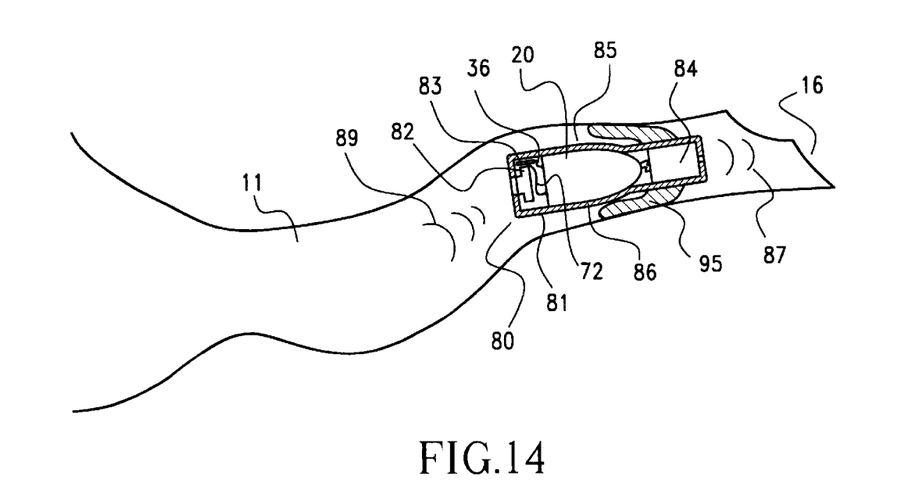
FIG. 14 is a cross sectional view of a disposable canal hearing device placed substantially in the bony part of the ear canal for extended wear therein, and in which the incorporated battery assembly is substantially non-occluding when placed therein.

The internal volume within the single-walled anode section of the present invention is substantially larger than that of the triple-walled anode section of conventional cells. For example, the anode section of conventional button cell designs is circumferentially surrounded by the cathode can as shown in FIGS. 1 and 2. The present invention also aids in significantly improving the volumetric energy efficiency of the battery assembly within the oval ear canal by virtue of its oval cross section. Another advantage of a hearing device incorporating the invented battery assembly is the ability to be inserted much deeper in the ear canal and within exceptional proximity to the eardrum (FIG. 14). The reduction in the residual volume in the ear canal leads to reduced energy consumption of the hearing device as known in the field of hearing aid design.

Because of the improvements in volumetric energy efficiency and energy utilization, the invented battery assembly is particularly suited for use in canal hearing aids of the extended wear type according to the '717 application. Briefly described here, the canal hearing aid is worn deeply in the bony part of the ear canal continuously for a long period of time, preferably exceeding two months. This is in stark contrast with conventional hearing aids which are typically removed daily for sleeping and showering. The conventional battery is typically replaced within 1–2 weeks. For the extended wear application, enabled by the present invention, the hearing device is preferably disposable whereby the entire device is removed form the ear canal and disposed of once the electrical energy of its battery is depleted.

In the preferred embodiments, the metal shell of the invented battery assembly is structurally self-supporting and is essentially in direct exposure to the environment of the ear canal, thus eliminating the need for a secondary plastic enclosure typically used in conventional hearing aids with button cells.

FIG. 14 shows a disposable hearing device 80 comprised of a core assembly 85 and medially a sealing retainer 95. The core assembly 85 incorporates the elongated oval battery assembly 20 according to any of the embodiments shown in FIGS. 5–13. The core assembly 85 also comprises laterally a microphone section 81 and medially a speaker 84. The microphone section contains a microphone 82, for receiving incoming sounds 89 entering the ear canal 11, and amplifier circuit 83 for amplifying microphone signals representative of incoming sounds 89. The speaker 84 delivers amplified sound 87 towards the eardrum 16. The sealing retainer 95 acoustically seals the core assembly 85 in the bony part of the ear canal and also securely retains the hearing device within. The elongated oval battery assembly 20 is connected to the microphone section 81 via a terminal wires 36 and 72 welded onto the conductive surface of the metal battery assembly. A thin non-structural coating 86 encapsulates and protects the core assembly 85 including the metal battery assembly 20 therein. The canal hearing device 80 is completely and semi-permanently positioned in the ear canal for an extended period of time, partially due to the volumetric energy efficiency of the invented battery assembly. The canal device is shown primarily in the bony part of the ear canal. The disposable hearing device of FIG. 14 is volumetrically efficient since the battery assembly 20 incorporated within the device 80 can be relatively larger by not requiring an additional enclosure, typically a rigid acrylic housing in conventional hearing aid designs. The available space in the ear canal is consumed largely by the battery assembly, which is volumetrically energy efficient by its unique design as disclosed above. In a preferred embodiment of the hearing device shown in FIG. 14, the core assembly is universally shaped (one-size-fits-all) to fit in a variety of ear canals, regardless of the shape and size. This is made possible by selecting an appropriately sized sealing retainer 95 for a particular ear canal. The sealing retainer 95 is made soft and compliant to conform to the ear canal in a comfortable sealing manner. In the preferred embodiment of the invention, the core assembly is essentially suspended in the ear canal with little or no contact with the walls of the ear canal, and thus non-occluding, as shown in FIG. 14. This eliminates occlusion effects (physical and acoustic effects) typically associated with conventional hearing aids which occlude the ear canal. The non-occlusive nature of the invented battery assembly is particularly desirable for extended wear applications.

Although particularly suited for deep canal extended-wear applications as shown in FIG. 14, the invented battery assembly is also applicable for conventional canal hearing aid designs by exploiting its volumetric energy efficiency. Furthermore, the invented battery assembly may be used in any communication device positioned in the ear canal including canal devices that employ direct contact with the eardrum. Therefore, the application of the elongated oval battery assembly for providing volumetric efficiency in ear canal applications is not limited to the above examples and should become apparent to those skilled in the art.

Although a presently contemplated best mode of practicing the invention has been disclosed herein by reference to certain preferred embodiments and methods, it will be apparent to those skilled in the art that variations and modifications of the disclosed embodiments and methods may be implemented without departing from the spirit and scope of the invention. It is therefore intended that the invention shall be limited only to the extent required by the appended claims and the rules and principles of the applicable law.

What is claimed is:

1. A battery assembly for a canal hearing device, comprising:
    a cylindrically elongated metal shell medially tapered with a lateral base end having an opening therein forming a cavity within said shell, said shell being elongated with length (L) along the longitudinal axis of an ear canal when said canal hearing device is positioned within the ear canal, and oval in cross section having a long diameter ($D_L$) and a short diameter ($D_S$), said length (L) being greater than said short diameter $D_S$,
    a metal base cap for covering said lateral opening of said shell when assembled thereto, and
    a sealing grommet made of an electrically insulating material inserted in a sealing manner between said shell and said base cap.

2. The battery assembly of claim 1, wherein said shell is bullet shaped with oval cross section.

3. The battery assembly of claim 1, wherein the ratio of said long diameter ($D_L$) to said short diameter ($D_S$) is about 1.5.

4. The battery assembly of claim 1, wherein said battery assembly is of metal-air type.

5. The battery assembly of claim 1, wherein said shell contains zinc material as part of a battery therein.

6. The battery assembly of claim 1, wherein said shell is coated with thin non-structural biocompatible material when incorporated within said hearing device.

7. The battery assembly of claim 1, wherein said shell is structurally self-supporting and adapted to be substantially in direct contact with the environment of the ear canal when its associated hearing device is inserted therein, thereby eliminating the need for a secondary structural enclosure when incorporated within said hearing device.

8. The battery assembly of claim 1, wherein said base end of said shell comprises a bottom ledge for securing said base cap within said shell.

9. The battery assembly of claim 8, wherein said bottom ledge is formed by crimping said base end inwardly over said base cap.

10. The battery assembly of claim 8, wherein said bottom ledge is formed by a metal ring welded circumferentially at said base end.

11. The battery assembly of claim 1, wherein said base end of said metal shell comprises a circumferential groove for placement of said base cap thereover during the manufacture of said battery assembly.

12. The battery assembly of claim 11, wherein said base cap is crimped circumferentially over said groove within said base cap.

13. The battery assembly of claim 1 further comprising a cathode assembly positioned at the base end of said battery assembly.

14. The battery assembly of claim 13, wherein said base cap comprises one or more holes for air access into said cathode assembly.

15. The battery assembly of claim 13, wherein said cathode assembly comprises an air diffusion-limiting element.

16. The battery assembly of claim 13, wherein said cathode assembly comprises an air distribution element.

17. The battery assembly of claim 13, wherein said cathode assembly comprises an air-permeable hydrophobic element for allowing air access into the interior of said battery assembly while minimizing moisture penetration of said battery assembly.

18. The battery assembly of claim 1, wherein an electrical terminal of said battery assembly is formed by a conductive surface on the exterior of said battery assembly which is adapted to be contacted by an electrically conductive contact pad associated with said hearing device.

19. The battery assembly of claim 1, wherein an electrical terminal is formed by an external electrical wire soldered or welded onto an external conductive surface of said battery assembly.

20. The battery assembly of claim 1, wherein an electrical terminal is formed by a protruding pin soldered or welded onto an external conductive surface of said battery assembly.

21. The battery assembly of claim 1, wherein said shell comprises a retention ledge at the top of its base end for securing a cathode assembly and a grommet within said base end.

22. The battery assembly of claim 21, wherein said retention ledge is formed by a ring welded to the interior walls of said shell.

23. The battery assembly of claim 21, wherein said retention ledge is formed by a ring brazed to the interior walls of said shell.

24. The battery assembly of claim 21, wherein said retention ledge is formed by a collapsed bead along said shell.

25. A metal-air battery assembly associated with a canal hearing device, said battery assembly comprising:
   an anode can cylindrically elongated and medially tapered with length (L) along the longitudinal axis of an ear canal when said hearing device is positioned within the ear canal, said anode can having an oval cross section with a long diameter ($D_L$) and short diameter ($D_S$) across its cross section, said length (L) being greater than said short diameter ($D_S$), said anode can laterally comprising a base end having an opening therein forming a cavity within said anode can;
   a cathode cup covering said opening of said anode can, said cathode cup comprising one or more air holes for air access into said battery assembly; and
   a sealing element comprising an insulator material inserted in a sealing manner between said base end of said anode can and said cathode cup;
   said cathode cup being concentrically positioned within said base end of said anode can and secured therein partially by an inward ledge within said base end of said anode can.

26. The battery assembly of claim 25, wherein said anode can has thickness of less than 0.2 mm.

27. The battery assembly of claim 25, wherein the ratio of long diameter ($D_L$) to short diameter ($D_S$) is about 1.5.

28. The battery assembly of claim 25, wherein said anode can contains zinc.

29. The battery assembly of claim 25, wherein said battery assembly is coated with thin non-structural biocompatible material when incorporated within said hearing aid.

30. The battery assembly of claim 25, wherein said anode can is structurally self-supporting and being adapted to be substantially in direct contact with the environment of the ear canal when its associated hearing device is inserted therein, whereby eliminating the need for a secondary structural enclosure when incorporated within said hearing device.

31. The battery assembly of claim 25, wherein said inward ledge is formed by crimping inwardly and axially the base end of said anode can.

32. The battery assembly of claim 25, wherein said inward ledge is formed by a metal ring welded onto the anode can circumferentially at the base end.

33. The battery assembly of claim 25, wherein said cathode assembly comprises an air diffusion-limiting element.

34. The battery assembly of claim 25, wherein said cathode assembly comprises an air distribution element.

35. The battery assembly of claim 25, wherein said cathode assembly comprises an air-permeable hydrophobic element for allowing air access into the interior of said battery assembly while minimizing moisture penetration of said battery assembly.

36. The battery assembly of claim 25, wherein an electrical terminal is formed by an external electrical wire soldered or welded onto the external surface of said battery assembly being electrically conductive.

37. The battery assembly of claim 25, wherein shell comprises a retention ledge at the top of its base end for securing a cathode assembly and a grommet within said base end.

38. The battery assembly of claim 37, wherein retention ledge is formed by an oval ring brazed or welded along the interior walls of said shell.

39. A battery assembly associated with a canal hearing device, said battery assembly comprising:
   a cylindrically elongated metal shell being medially tapered with length (L) along the longitudinal axis of an ear canal when said hearing device is positioned within the ear canal, said shell having an oval cross section with short diameter ($D_S$) across its cross section, said length (L) being greater than said short diameter ($D_S$), said shell laterally comprising a base end and an opening therein forming a cavity within said shell, and
   a base cap covering said opening of said metal shell,
   said metal shell being structurally self-supporting and being adapted to be substantially exposed and essentially in direct contact with the environment of the ear canal when its associated hearing device is inserted therein, whereby to eliminate the need for a secondary structural enclosure when incorporated within said hearing device.

40. The battery assembly of claim 39, wherein said battery assembly is coated with thin non-structural biocompatible material when incorporated within said hearing aid.

41. The battery assembly of claim 39, wherein said base end of said shell comprises an inward ledge formed for securing said base cap within said shell.

42. The battery assembly of claim 41, wherein said inward ledge is formed by crimping inwardly and axially said base end.

43. The battery assembly of claim 41, wherein said inward ledge is formed by a metal ring welded onto the base end of said shell.

44. The battery assembly of claim 39, wherein said base end of said shell comprises a circumferential groove for placement of said base cap thereover.

45. The battery assembly of claim 39, wherein shell comprises a retention ledge at the top of its base end for securing a cathode assembly and a grommet within said base end.

46. A hearing device incorporating a battery assembly, said battery assembly comprising:
   a cylindrically elongated metal shell medially tapered with lateral base having an opening therein forming a cavity within said shell,
   a metal base cap covering said opening of said shell, and
   a sealing element made of an electrically insulating material inserted in a sealing manner between said base cap and said shell,
   said battery assembly being elongated with length (L) along the longitudinal axis of an ear canal when said battery assembly is positioned therein, and oval in cross section having a short diameter ($D_S$), said length (L) being greater than said short diameter ($D_S$),
   said battery assembly being cylindrically elongated and having oval cross section resembling the shape of said ear canal to maximize the energy capacity of said battery assembly and to optimize the fit and comfort of said battery assembly within said ear canal.

47. The hearing device of claim 46, wherein said battery assembly is zinc-air type.

48. The hearing device of claim 46, wherein said battery assembly is adapted to fit in the ear canal with minimal or no contact with the walls thereof, whereby to be non occluding therein.

49. The hearing device of claim 46, adapted for single-use disposability upon depletion of the electrical energy of said battery assembly.

50. The hearing device of claim 46, adapted for extended wear within the ear canal.

51. A hearing device incorporating a battery assembly, said battery assembly comprising:
   a metal shell cylindrically elongated and medially tapered with length (L) along the longitudinal axis of an ear canal when said hearing device is positioned within the ear canal, said shell having an oval cross section having a short diameter ($D_S$) across its cross section, said length (L) being greater than said short diameter ($D_S$), said shell comprises a lateral base end having an opening therein forming a cavity within said shell, and
   a base cap covering said opening of said metal shell,
   said metal shell being structurally self-supporting and adapted to be substantially exposed and essentially in direct contact with the environment of the ear canal when its associated hearing device is inserted therein, whereby to eliminate the need for a secondary structural enclosure when incorporated within said hearing device.

52. The hearing device of claim 51, adapted for single-use disposability upon depletion of the electrical energy of said battery assembly incorporated therein.

53. The hearing device of claim 51, wherein said battery assembly is adapted to fit in the ear canal with minimal or no contact with the walls thereof, whereby to be non occluding therein.

54. The hearing device of claim 51 adapted for extended wear within the ear canal.

* * * * *